(12) United States Patent
Tang

(10) Patent No.: US 11,363,562 B2
(45) Date of Patent: Jun. 14, 2022

(54) METHOD FOR SENDING AND RECEIVING PAGING MESSAGE, NETWORK DEVICE AND USER DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/985,201

(22) Filed: Aug. 4, 2020

(65) Prior Publication Data
US 2020/0367198 A1    Nov. 19, 2020

Related U.S. Application Data

(63) Continuation of application No. PCT/CN2018/075270, filed on Feb. 5, 2018.

(51) Int. Cl.
*H04W 4/00* (2018.01)
*H04W 68/00* (2009.01)
*H04W 24/08* (2009.01)
*H04W 72/04* (2009.01)

(52) U.S. Cl.
CPC ........ *H04W 68/005* (2013.01); *H04W 24/08* (2013.01); *H04W 72/046* (2013.01)

(58) Field of Classification Search
USPC .............. 455/450–452.1, 458; 370/329, 330
See application file for complete search history.

(56) References Cited

U.S. PATENT DOCUMENTS

| | | | | |
|---|---|---|---|---|
| 8,416,750 | B1* | 4/2013 | Vargantwar | H04W 72/1242 370/337 |
| 2015/0237577 | A1* | 8/2015 | Zhang | H04L 5/0053 370/311 |
| 2017/0366236 | A1 | 12/2017 | Ryoo et al. | |
| 2019/0289534 | A1* | 9/2019 | Ryoo | H04W 80/02 |

FOREIGN PATENT DOCUMENTS

| | | |
|---|---|---|
| CN | 106961729 | 7/2017 |
| WO | 2014071551 | 5/2014 |
| WO | 2017174469 | 10/2017 |

OTHER PUBLICATIONS

EPO, Extended European Search Report for EP Application No. 18904363.1, dated Jan. 11, 2021.
Sequans Communications, "Reduced overhead paging design," 3GPP TSG-RAN WG1 Meeting AH 1801, Jan. 26, 2018.
InterDigital Communications, "Paging Aspects for Multi-beam Operation," 3GPP TSG-RAN WG2 Meeting #97, Feb. 17, 2017.

(Continued)

*Primary Examiner* — Suhail Khan
(74) *Attorney, Agent, or Firm* — Hodgson Russ LLP

(57) ABSTRACT

Disclosed in the present invention are a method for sending and receiving a paging message, a network device, a terminal device and a computer storage medium. The method includes: when paging for a terminal device is triggered, determining whether to interlacedly send the paging message to the terminal device based on a terminal type of the terminal device.

4 Claims, 2 Drawing Sheets

---

201
Report the terminal type to a core network

202
When paging is performed, determine whether to interlacedly monitor the paging message based on the terminal type of the terminal device

(56) References Cited

OTHER PUBLICATIONS

Interdigital, Inc., "Overhead reduction techniques for NR paging based on beam sweeping," 3GPP TSG RAN WG1 Meeting #91, Dec. 1, 2017.
ETSI MCC, "Report of 3GPP TSG RAN2#AH-1801 meeting, Vancouver, Canada," 3GPP TSG-RAN WG2 meeting #101, R2-1801702, Feb. 2018, 137 pages.
WIPO, ISR for PCT/CN2018/075270, dated Oct. 26, 2018.
KIPO, Office Action for KR Application No. 10-2020-7024506, dated Sep. 27, 2021.

* cited by examiner

METHOD FOR SENDING AND RECEIVING PAGING MESSAGE, NETWORK DEVICE AND USER DEVICE

CROSS-REFERENCE TO RELATED APPLICATION

This application is a continuation application of International Application No. PCT/CN2018/075270, filed Feb. 5, 2018, the entire disclosure of which is incorporated herein by reference.

TECHNICAL FIELD

Embodiments of the present disclosure generally relate to information process technologies, and more particularly, to methods for sending and receiving a paging message, a network device, a terminal device and a computer storage medium.

BACKGROUND

In 5G technologies, a cell generally adopts multibeam form. In order to page to a UE (user equipment), a paging message is sent on each beam in each cell. For a cell with high-frequency deployment, there are many beams, for example, 64 beams, and accordingly, the paging message is send in the cell for 64 times. This increases the signaling load of the network.

In the future 5G networks, there are a large number of terminals which belong to a delay tolerant type, that is, such terminals are not eager to access the network immediately, and such terminals may exist in the future 5G networks in large numbers, such as Internet of Things (IoT) terminals like electric meters or water meters. This type of terminals still use the methods in related arts to receive paging messages, which may cause heavy signaling load and high power consumption for the terminal devices.

SUMMARY

In order to address the above technical problems, embodiments of the present disclosure provide methods for sending and receiving a paging message, a network device, a terminal device and a computer storage medium.

An embodiment of the present disclosure provides a method for sending a paging message, the method including:

when paging for a terminal device is triggered, determining whether to interlacedly send the paging message to the terminal device based on a terminal type of the terminal device.

An embodiment of the present disclosure provides a method for receiving a paging message, the method including:

when paging is performed, determining whether to interlacedly monitor the paging message based on a terminal type of a terminal device.

An embodiment of the present disclosure provides a network device, including:

a first processing unit configured to, when paging for a terminal device is triggered, determine whether to interlacedly send the paging message to the terminal device based on a terminal type of the terminal device.

An embodiment of the present disclosure provides a terminal device, including:

a second processing unit configured to, when paging is performed, determine whether to interlacedly monitor the paging message based on a terminal type of the terminal device.

An embodiment of the present disclosure provides a network device, including:

a processor; and
a memory for storing computer programs executable by the processor,
wherein when the computer programs are executed by the processor, the processor is caused to perform steps of the methods previously described.

An embodiment of the present disclosure provides a terminal device, including:

a processor; and
a memory for storing computer programs executable by the processor,
wherein when the computer programs are executed by the processor, the processor is caused to perform steps of the methods previously described.

An embodiment of the present disclosure provides a computer storage medium having computer-executable instructions stored thereon, wherein when the computer-executable instructions are executed, steps of the methods previously described are implemented.

The technical solutions according to embodiments of the present disclosure adopt an interleaved paging message sending method when a paging message is sent for a terminal device of a specific terminal type. Therefore, the density of transmitted paging messages is reduced, thereby reducing the system signaling load, and reducing the power consumption of the terminal device caused by receiving of paging messages.

DETAILED DESCRIPTION

In order to make the features and technical contents of embodiments of the present disclosure more clear, the following describes the implementations of the embodiments of the present disclosure in detail with reference to the drawings. The accompanying drawings are provided for illustration only and are not intended to limit the embodiments of the present disclosure.

First Embodiment

The embodiment of the present disclosure provides a method for sending a paging message, including:

when paging for a terminal device is triggered, determining whether to interlacedly send the paging message to the terminal device based on a terminal type of the terminal device.

Figure 1:
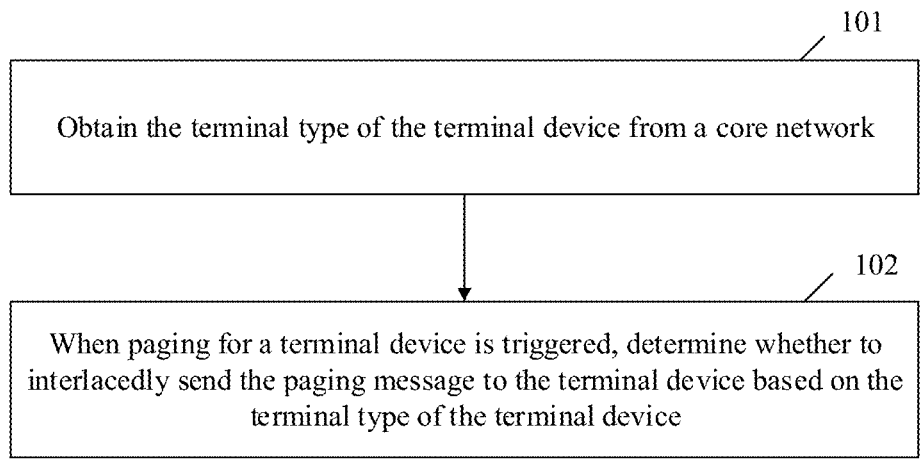
FIG. 1 is a schematic flowchart of a method for sending a paging message according to an embodiment of the present disclosure.

As shown in FIG. 1, the method provided in the embodiment includes the following steps:

In step 101, the terminal type of the terminal device is obtained from a core network.

In step 102, when paging for a terminal device is triggered, whether to interlacedly send the paging message to the terminal device is determined based on the terminal type of the terminal device.

According to embodiments, determining whether to interlacedly send the paging message to the terminal device based on the terminal type of the terminal device includes:

when the terminal type of the terminal device is a high-latency terminal, sending the paging message for the terminal device on at least one beam in at least one paging occasion.

It should be understood that the solutions provided in the embodiment is applied to the network side, and for example, can be applied to a base station on the network side.

The terminal type of the terminal device can be reported to the core network by the terminal device. When the terminal needs to be paged, the terminal type of the terminal device is obtained from the core network. In other words, terminals are classified, and terminal types are defined for the terminals. UEs may report their terminal types to the network. When paging for a terminal is triggered, the network side carries the terminal type to the base station. The base station constructs the paging message according to the terminal type and sends the paging message.

According to embodiments, the terminal types of terminal devices may include high-latency terminals and low-latency terminals. The high-latency terminal may be understood as an IoT-like terminal. Since the IoT terminal is different from a call-type terminal (i.e., a terminal used to initiate calls or receive calls), the IoT terminal does not need to obtain information from the network side in time for a long time. Therefore, the number of pagings for such terminals can be appropriately reduced. According other embodiments, the terminal types can also be divided into a delay-tolerant type terminal, an Internet of Things terminal, or the like.

The base station receives a paging message for the terminal from the core network, and the paging message carries the terminal type.

In addition, in the above embodiments, the interleaved paging message sending method may be that the base station sends the paging messages in a time division manner in multi-beam operation. For example, determining whether to interlacedly send the paging message to the terminal device based on the terminal type of the terminal device includes:

when the terminal type of the terminal device is a high-latency terminal, sending the paging message for the terminal device on at least one beam in at least one paging occasion (PO).

Before sending the paging message on at least one beam, a transmission period or a transmission window for the paging message may be determined. K paging occasions are set in the transmission period or the transmission window; K is an integer. Here, a period or a window for sending paging messages can be defined, and k PO periods are included in the window. The length of the transmission period or the transmission window for the paging message can be set depending on actual requirements.

The sending the paging message for the terminal device on at least one beam in at least one paging occasion includes:

in at least part of the K paging occasions set in the transmission period or the transmission window, performing a modulo calculation based on an identifier of at least one beam included in the paging occasions and K; and based on a modulo calculation result, determining an identifier of a transmission beam, and sending the paging message on the determined transmission beam.

Assuming that there are two paging occasions, the paging message is sent on the beam with beam ID mod 2=0 or 1 in the first paging occasion, and the paging message is sent on the beam with beam ID mod 2=1 or 0 in the next paging occasion. It should be noted that, in the foregoing two paging occasions, the corresponding transmission beam identifiers in different paging occasions may be the same or different.

For example, the paging message is sent on the beam with beam ID mod k=0 in the first PO in the window, and the paging message is sent on the beam with beam ID mod k=1 in the next PO, and the paging message is sent in a similar way in other paging occasions until the K-th paging occasion PO in which the paging message can be sent on the beam with beam ID mod k=k−1.

Specifically speaking, for example, there may be two POs in the current paging window, and there are multiple beams in each PO. When there are 3 beams in PO1, 1 mod 2=1, 2 mod 2=0, 3 mod 2=1. It can be determined to send the paging message on the beam with modulo calculation result=0, that is, the paging message is sent on the beam with beam ID=2. If there are 4 beams in PO2, it can be determined to send the paging message on any beam with modulo calculation result=1, that is, the paging message can be sent on any of beams 1 and 3.

It can be seen that by adopting the above solutions, it is possible to use an interleaved paging message sending method when a paging message is sent for a terminal device of a specific terminal type. Therefore, the density of transmitted paging messages is reduced, thereby reducing the system signaling load, and reducing the power consumption of the terminal device caused by receiving of paging messages.

Second Embodiment

An embodiment of the present disclosure provides a method for receiving a paging message, including:

when paging is performed, determining whether to interlacedly monitor the paging message based on a terminal type of a terminal device.

Figure 2:
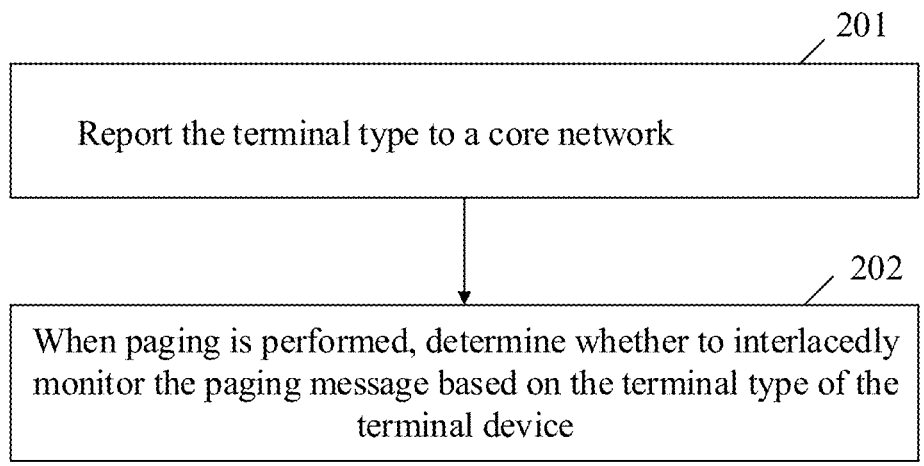
FIG. 2 is a schematic flowchart of a method for receiving a paging message according to an embodiment of the present disclosure.

As shown in FIG. 2, the method provided in the embodiment includes the following steps:

In step 201, a terminal type is reported to a core network.

In step 202, when paging is performed, whether to interlacedly monitor the paging message is determined based on the terminal type of a terminal device.

Determining whether to interlacedly monitor the paging message based on the terminal type of the terminal device includes:

when the terminal type of the terminal device is a high-latency terminal, receiving the paging message for the terminal device sent from a network side on at least one beam in at least one paging occasion.

It should be noted that the solution provided by the embodiment is applied to a terminal device.

The terminal type of the terminal device can be reported to the core network by the terminal device. When the terminal needs to be paged, the terminal type of the terminal device is obtained from the core network. In other words, terminals are classified, and terminal types are defined for the terminals. UEs may report their terminal types to the network. When paging for a terminal is triggered, the network side carries the terminal type to the base station.

The base station constructs the paging message according to the terminal type and sends the paging message.

According to embodiments, the terminal types of terminal devices may include high-latency terminals and low-latency terminals. The high-latency terminal may be understood as an terminal similar to an IoT terminal. Since the IoT terminal is different from a call-type terminal (i.e., a terminal used to initiate calls or receive calls), the IoT terminal does not need to always obtain information from the network side in time. Therefore, the number of pagings for such terminals can be appropriately reduced. According other embodiments, the terminal types can also be divided into a delay-tolerant type terminal, an Internet of Things terminal, or the like.

The base station receives a paging message for the terminal from the core network, and the paging message carries the terminal type.

In addition, in the above embodiments, the interleaved paging message sending method may be that the base station sends the paging messages in a time division manner in multi-beam operation. For example, determining whether to interlacedly send the paging message to the terminal device based on the terminal type of the terminal device includes:

when the terminal type of the terminal device is a high-latency terminal, sending the paging message for the terminal device on at least one beam in at least one paging occasion (PO).

Before sending the paging message on at least one beam, a transmission period or a transmission window for the paging message may be determined. K paging occasions are set in the transmission period or the transmission window; K is an integer. Here, a period or a window for sending paging messages can be defined, and k PO periods are included in the window. The length of the transmission period or the transmission window for the paging message can be set depending on actual requirements.

Then, in at least part of the K paging occasions set in the transmission period or the transmission window, the base station performs a modulo calculation based on an identifier of at least one beam included in the paging occasions and K; and based on the modulo calculation result, an identifier of a transmission beam is determined, and the paging message is sent on the determined transmission beam.

Assuming that there are two paging occasions, the paging message is sent on the beam with beam ID mod 2=0 or 1 in the first paging occasion, and the paging message is sent on the beam with beam ID mod 2=1 or 0 in the next paging occasion. It should be noted that, in the foregoing two paging occasions, the corresponding transmission beam identifiers in different paging occasions may be the same or different.

For example, the paging message is sent on the beam with beam ID mod k=0 in the first PO in the window, and the paging message is sent on the beam with beam ID mod k=1 in the next PO, and the paging message is sent in a similar way in other paging occasions until the K-th paging occasion PO in which the paging message can be sent on the beam with beam ID mod k=k−1.

Specifically speaking, for example, there may be two POs in the current paging window, and there are multiple beams in each PO. When there are 3 beams in PO1, 1 mod 2=1, 2 mod 2=0, 3 mod 2=1. It can be determined to send the paging message on the beam with modulo calculation result=0, that is, the paging message is sent on the beam with beam ID=2. If there are 4 beams in PO2, it can be determined to send the paging message on any beam with modulo calculation result=1, that is, the paging message can be sent on any of beams 1 and 3.

Based on the above description, the following focuses on describing how the terminal device receives the paging message. There may be the following two processing methods:

Processing method 1: when the terminal type of the terminal device is a high-latency terminal, the paging message for the terminal device sent from a network side is received on at least one beam in at least one paging occasion.

Receiving the paging message for the terminal device sent from the network side on at least one beam in at least one paging occasion includes:

monitoring the paging message in K paging occasions in a transmission period or a transmission window.

In other words, whether the terminal device is a high-latency or low-latency terminal, the terminal device can monitor the paging message on all beams in all paging occasions in each transmission period or transmission window, until the terminal device receives the paging message associated with the terminal device itself Processing method 1: K paging occasions in a transmission period or a transmission window for the paging message are obtained from broadcast information; wherein K is an integer.

In this case, it is possible to monitor the paging message from possible paging occasions and possible transmission beams for the terminal device based on a predetermined calculation method.

For example, the terminal device may determine at least one paging occasion for monitoring the paging message based on the beam where the terminal device currently resides in.

In this method, the terminal device can receive the paging message only in certain paging occasions. That is, in order to save power for the UE, k can be broadcasted by a broadcast message, and then the UE decides to transmit or receive the paging message on which PO based on the beam where the terminal device currently resides in.

The calculation method may be as follows. First, based on the number K of paging occasions, a value is obtained by taking the beam identifier mod K; and whether the value is a preset value is determined so as to determine the paging occasion for receiving the paging message.

For example, it is assumed that the beam where the terminal device currently resides in is beam 1, and the number of paging occasions is 3; 1 mod 3=1. It is set that the beam for sending the paging message is determined based on the calculation result of taking the beam ID mod K. For PO1, it is set that the paging message is sent on the transmission beam with the calculation result equal to 1. That is, if there are four beams in PO1, the paging message can be sent on the beam with the beam ID of 1 or 4. In PO2, the calculated identifier is equal to 2, that is, the paging message can be sent on the beam with the beam ID of 2 in PO2. In PO3, the calculated identifier is 0, that is, the paging message can be sent on the beam with the beam ID of 4 in PO3. If the identifier of the beam where the terminal device currently resides in is 1, then it is needed to monitor the paging message in the first paging occasion PO1. It should be understood that the above is only an example, and actually there may be more POs and there may be more beams in each PO, and the present disclosure do not list all variations.

The technical solutions according to embodiments of the present disclosure adopt an interleaved paging message sending method when a paging message is sent for a terminal device of a specific terminal type. Therefore, the density of transmitted paging messages is reduced, thereby reducing the system signaling load, and reducing the power consumption of the terminal device caused by receiving of paging messages.

Third Embodiment

Figure 3:
FIG. 3 is a schematic block diagram of a network device according to an embodiment of the present disclosure.

The embodiment of the present disclosure provides a network device. As shown in FIG. 3, the network device includes a first processing unit 31.

The first processing unit 31 is configured to, when paging for a terminal device is triggered, determine whether to interlacedly send the paging message to the terminal device based on a terminal type of the terminal device.

The network device further includes:

a first communication unit 32 configured to obtain the terminal type of the terminal device from a core network.

According to embodiments, the first processing unit 31 is configured to:

when the terminal type of the terminal device is a high-latency terminal, send the paging message for the terminal device on at least one beam in at least one paging occasion.

It should be understood that the solutions provided in the embodiment is applied to the network side, and for example, can be applied to a base station on the network side.

The terminal type of the terminal device can be reported to the core network by the terminal device. When the terminal needs to be paged, the terminal type of the terminal device is obtained from the core network. In other words, terminals are classified, and terminal types are defined for the terminals. UEs may report their terminal types to the network. When paging for a terminal is triggered, the network side carries the terminal type to the base station. The base station constructs the paging message according to the terminal type and sends the paging message.

According to embodiments, the terminal types of terminal devices may include high-latency terminals and low-latency terminals. The high-latency terminal may be understood as an IoT-like terminal. Since the IoT terminal is different from a call-type terminal (i.e., a terminal used to initiate calls or receive calls), the IoT terminal does not need to obtain information from the network side in time for a long time. Therefore, the number of pagings for such terminals can be appropriately reduced. According other embodiments, the terminal types can also be divided into a delay-tolerant type terminal, an Internet of Things terminal, or the like.

The base station receives a paging message for the terminal from the core network, and the paging message carries the terminal type.

In addition, in the above embodiments, the interleaved paging message sending method may be that the base station sends the paging messages in a time division manner in multi-beam operation. The first processing unit 31 is configured to:

when the terminal type of the terminal device is a high-latency terminal, send the paging message for the terminal device on at least one beam in at least one paging occasion (PO).

Before sending the paging message on at least one beam, a transmission period or a transmission window for the paging message may be determined. K paging occasions are set in the transmission period or the transmission window; K is an integer. Here, a period or a window for sending paging messages can be defined, and k PO periods are included in the window. The length of the transmission period or the transmission window for the paging message can be set depending on actual requirements.

According to embodiments, the first processing unit 31 is configured to:

in at least part of the K paging occasions set in the transmission period or the transmission window, perform a modulo calculation based on an identifier of at least one beam included in the paging occasions and K; and based on a modulo calculation result, determine an identifier of a transmission beam, and sending the paging message on the determined transmission beam.

Assuming that there are two paging occasions, the paging message is sent on the beam with beam ID mod 2=0 or 1 in the first paging occasion, and the paging message is sent on the beam with beam ID mod 2=1 or 0 in the next paging occasion. It should be noted that, in the foregoing two paging occasions, the corresponding transmission beam identifiers in different paging occasions may be the same or different.

For example, the paging message is sent on the beam with beam ID mod k=0 in the first PO in the window, and the paging message is sent on the beam with beam ID mod k=1 in the next PO, and the paging message is sent in a similar way in other paging occasions until the K-th paging occasion PO in which the paging message can be sent on the beam with beam ID mod k=k−1.

Specifically speaking, for example, there may be two POs in the current paging window, and there are multiple beams in each PO. When there are 3 beams in PO1, 1 mod 2=1, 2 mod 2=0, 3 mod 2=1. It can be determined to send the paging message on the beam with modulo calculation result=0, that is, the paging message is sent on the beam with beam ID=2. If there are 4 beams in PO2, it can be determined to send the paging message on any beam with modulo calculation result=1, that is, the paging message can be sent on any of beams 1 and 3.

It can be seen that by adopting the above solutions, it is possible to use an interleaved paging message sending method when a paging message is sent for a terminal device of a specific terminal type. Therefore, the density of transmitted paging messages is reduced, thereby reducing the system signaling load, and reducing the power consumption of the terminal device caused by receiving of paging messages.

Fourth Embodiment

Figure 4:
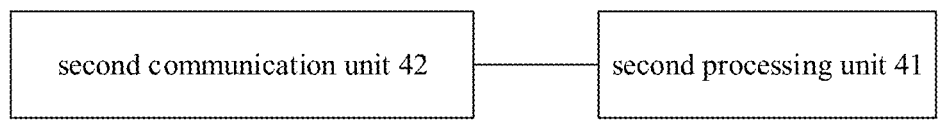
FIG. 4 is a schematic block diagram of a terminal device according to an embodiment of the present disclosure.

An embodiment of the present disclosure provides a terminal device. As shown in FIG. 4, the terminal device includes a second processing unit 41.

The second processing unit 41 is configured to, when paging is performed, determine whether to interlacedly monitor the paging message based on a terminal type of a terminal device.

The terminal device further includes:

a second communication 42 configured to report a terminal type to a core network.

According to embodiments, the second processing unit 41 is configured to:

when the terminal type of the terminal device is a high-latency terminal, receive the paging message for the terminal device sent from a network side on at least one beam in at least one paging occasion.

It should be noted that the solution provided by the embodiment is applied to a terminal device.

The terminal type of the terminal device can be reported to the core network by the terminal device. When the terminal needs to be paged, the terminal type of the terminal device is obtained from the core network. In other words, terminals are classified, and terminal types are defined for the terminals. UEs may report their terminal types to the network. When paging for a terminal is triggered, the network side carries the terminal type to the base station. The base station constructs the paging message according to the terminal type and sends the paging message.

According to embodiments, the terminal types of terminal devices may include high-latency terminals and low-latency terminals. The high-latency terminal may be understood as an terminal similar to an IoT terminal. Since the IoT terminal is different from a call-type terminal (i.e., a terminal used to initiate calls or receive calls), the IoT terminal does not need to always obtain information from the network side in time. Therefore, the number of pagings for such terminals can be appropriately reduced. According other embodiments, the terminal types can also be divided into a delay-tolerant type terminal, an Internet of Things terminal, or the like.

The base station receives a paging message for the terminal from the core network, and the paging message carries the terminal type.

In addition, in the above embodiments, the interleaved paging message sending method may be that the base station sends the paging messages in a time division manner in multi-beam operation. For example, determining whether to interlacedly send the paging message to the terminal device based on the terminal type of the terminal device includes:

when the terminal type of the terminal device is a high-latency terminal, sending the paging message for the terminal device on at least one beam in at least one paging occasion (PO).

Before sending the paging message on at least one beam, a transmission period or a transmission window for the paging message may be determined. K paging occasions are set in the transmission period or the transmission window; K is an integer. Here, a period or a window for sending paging messages can be defined, and k PO periods are included in the window. The length of the transmission period or the transmission window for the paging message can be set depending on actual requirements.

Then, in at least part of the K paging occasions set in the transmission period or the transmission window, the base station performs a modulo calculation based on an identifier of at least one beam included in the paging occasions and K; and based on the modulo calculation result, an identifier of a transmission beam is determined, and the paging message is sent on the determined transmission beam.

Assuming that there are two paging occasions, the paging message is sent on the beam with beam ID mod 2=0 or 1 in the first paging occasion, and the paging message is sent on the beam with beam ID mod 2=1 or 0 in the next paging occasion. It should be noted that, in the foregoing two paging occasions, the corresponding transmission beam identifiers in different paging occasions may be the same or different.

For example, the paging message is sent on the beam with beam ID mod k=0 in the first PO in the window, and the paging message is sent on the beam with beam ID mod k=1 in the next PO, and the paging message is sent in a similar way in other paging occasions until the K-th paging occasion PO in which the paging message can be sent on the beam with beam ID mod k=k−1.

Specifically speaking, for example, there may be two POs in the current paging window, and there are multiple beams in each PO. When there are 3 beams in PO1, 1 mod 2=1, 2 mod 2=0, 3 mod 2=1. It can be determined to send the paging message on the beam with modulo calculation result=0, that is, the paging message is sent on the beam with beam ID=2. If there are 4 beams in PO2, it can be determined to send the paging message on any beam with modulo calculation result=1, that is, the paging message can be sent on any of beams 1 and 3.

Based on the above description, the following focuses on describing how the terminal device receives the paging message. There may be the following two processing methods:

Processing method 1: when the terminal type of the terminal device is a high-latency terminal, the second processing unit 41 receives the paging message for the terminal device sent from a network side on at least one beam in at least one paging occasion.

According to embodiments, the second processing unit 41 monitors the paging message in K paging occasions in a transmission period or a transmission window.

In other words, whether the terminal device is a high-latency or low-latency terminal, the terminal device can monitor the paging message on all beams in all paging occasions in each transmission period or transmission window, until the terminal device receives the paging message associated with the terminal device itself Processing method 1: the second communication unit 42 obtains K paging occasions in a transmission period or a transmission window for the paging message from broadcast information; wherein K is an integer.

In this case, it is possible to monitor the paging message from possible paging occasions and possible transmission beams for the terminal device based on a predetermined calculation method.

For example, the second processing unit 41 may determine at least one paging occasion for monitoring the paging message based on the beam where the terminal device currently resides in.

In this method, the terminal device can receive the paging message only in certain paging occasions. That is, in order to save power for the UE, k can be broadcasted by a broadcast message, and then the UE decides to transmit or receive the paging message on which PO based on the beam where the terminal device currently resides in.

The calculation method may be as follows. First, based on the number K of paging occasions, a value is obtained by taking the beam identifier mod K; and whether the value is a preset value is determined so as to determine the paging occasion for receiving the paging message.

For example, it is assumed that the beam where the terminal device currently resides in is beam 1, and the number of paging occasions is 3; 1 mod 3=1. It is set that the beam for sending the paging message is determined based on the calculation result of taking the beam ID mod K. For PO1, it is set that the paging message is sent on the transmission beam with the calculation result equal to 1. That is, if there are four beams in PO1, the paging message can be sent on the beam with the beam ID of 1 or 4. In PO2, the calculated identifier is equal to 2, that is, the paging message can be sent on the beam with the beam ID of 2 in PO2. In PO3, the calculated identifier is 0, that is, the paging message can be sent on the beam with the beam ID of 4 in PO3. If the identifier of the beam where the terminal device currently resides in is 1, then it is needed to monitor the paging message in the first paging occasion PO1. It should be understood that the above is only an example, and actually there may be more POs and there may be more beams in each PO, and the present disclosure do not list all variations.

The technical solutions according to embodiments of the present disclosure adopt an interleaved paging message sending method when a paging message is sent for a terminal device of a specific terminal type. Therefore, the density of transmitted paging messages is reduced, thereby reducing the system signaling load, and reducing the power consumption of the terminal device caused by receiving of paging messages.

Figure 5:
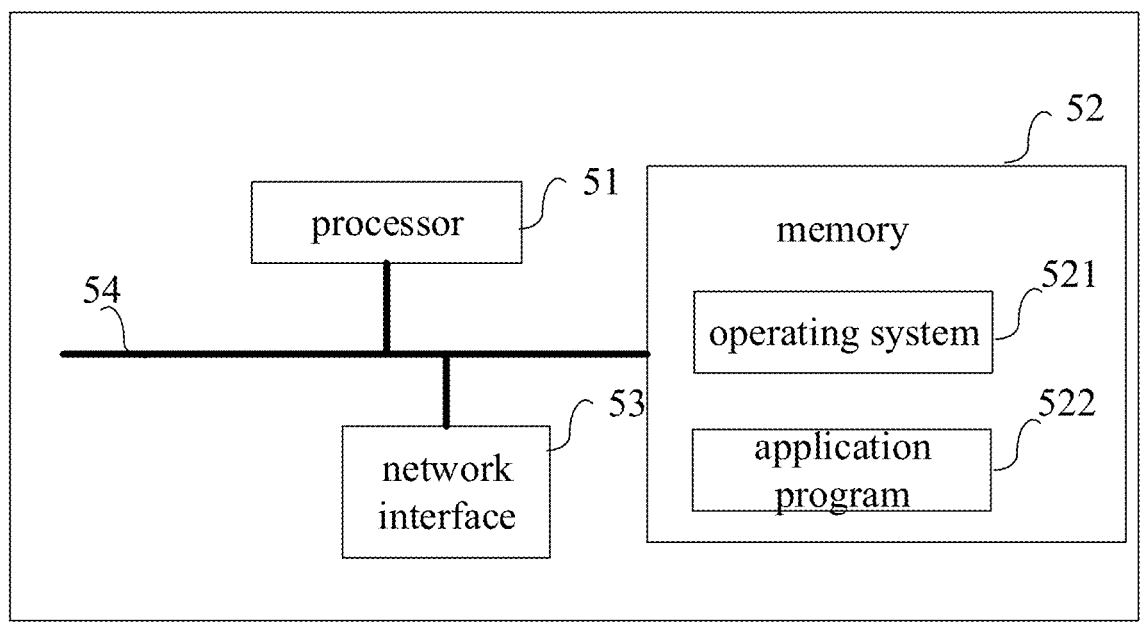
FIG. 5 is a schematic diagram of a hardware architecture according to an embodiment of the present disclosure.

An embodiment of the present disclosure provides a hardware composition architecture of a network device or a terminal device. As shown in FIG. 5, the architecture includes: at least one processor 51, a memory 52, and at least one network interface 53. The components are coupled together via a bus system 54. It should be understood that the bus system 54 is used to implement connection and communication between these components. In addition to a data bus, the bus system 54 may also include a power bus, a control bus, and a status signal bus. However, for the sake of clarity, various buses are collectively referred to as the bus system 54 in FIG. 5.

It can be understood that the memory 52 in the embodiments of the present disclosure may be a volatile memory or a non-volatile memory, or may include both volatile and non-volatile memory.

In some embodiments, the memory 52 stores the following elements:
executable modules or data structures, or their subsets, or their extensions:
operating system 521 and application program 522.

The processor 51 is configured to be execute method steps in the first or second embodiment, which will not be repeated here.

An embodiment of the present disclosure provides a computer storage medium that stores computer-executable instructions. When the computer-executable instructions are executed, the method steps of the foregoing first or second embodiment are implemented.

In embodiments of the present disclosure, if the devices are implemented in the form of a software functional module and sold or used as an independent product, they may also be stored in a computer-readable storage medium. Based on such an understanding, the technical solutions of the embodiments of the present disclosure that are essential or contribute to the existing technologies can be embodied in the form of software products. The computer software product is stored in a storage medium and includes several instructions to cause a computer device (which may be a personal computer, a server, or a network device) to perform all or part of the methods described in the embodiments of the present disclosure. The storage medium includes various mediums that can store program codes, such as a U disk, a mobile hard disk, a read only memory (ROM), a magnetic disk, or an optical disk. In this way, the embodiments of the present disclosure are not limited to any specific combination of hardware and software.

Correspondingly, an embodiment of the present disclosure also provides a computer storage medium in which computer programs are stored, and the computer programs are configured to execute the methods according to embodiments of the present disclosure.

Although exemplary embodiments of the present disclosure have been disclosed for illustrative purposes, those skilled in the art will realize that various improvements, additions, and substitutions are also possible, and therefore, the scope of the present disclosure should not be limited to the above-described embodiments.

What is claimed is:

1. A method for receiving a paging message, comprising:
when a paging message for a terminal device is received, determining whether to interlacedly monitor the paging message based on a terminal type of the terminal device,
wherein determining whether to interlacedly monitor the paging message based on the terminal type of the terminal device comprises:
when the terminal type of the terminal device is a high-latency terminal, receiving the paging message on at least one beam in at least one paging occasion by:
obtaining K paging occasions in a transmission period or a transmission window for the paging message from broadcast information; wherein K is an integer;
performing a modulo calculation: beam id mod K, wherein beam id is an identifier of a beam where the terminal device currently resides in, and determining at least one paging occasion corresponding to a preset modulo calculation result; and
monitoring the paging message in the determined paging occasion.

2. The method according to claim 1, further comprising: reporting the terminal type to a core network.

3. A terminal device, comprising:
a processor; and
a memory for storing computer programs executable by the processor;
wherein when the computer programs are executed by the processor, the processor is caused to:
when a paging message for a terminal device is received, determine whether to interlacedly monitor the paging message based on a terminal type of the terminal device,
when the terminal type of the terminal device is a high-latency terminal, the processor is further configured to receive the paging message on at least one beam in at least one paging occasion by:
obtaining K paging occasions in a transmission period or a transmission window for the paging message from broadcast information; wherein K is an integer;
performing a modulo calculation: beam id mod K, wherein beam id is an identifier of a beam where the terminal device currently resides in, and determining at least one paging occasion corresponding to a preset modulo calculation result; and
monitoring the paging message in the determined paging occasion.

4. The terminal according to claim 3, wherein the processor is configured to report the terminal type to a core network.

* * * * *